(12) United States Patent
Yee

(10) Patent No.: US 7,408,332 B2
(45) Date of Patent: Aug. 5, 2008

(54) INTELLIGENT SOFT START FOR SWITCHING REGULATORS

(75) Inventor: Philip W. Yee, Los Altos, CA (US)

(73) Assignee: Micrel, Inc., San Jose, CA (US)

( * ) Notice: Subject to any disclaimer, the term of this patent is extended or adjusted under 35 U.S.C. 154(b) by 314 days.

(21) Appl. No.: 11/259,671

(22) Filed: Oct. 26, 2005

(65) Prior Publication Data

US 2007/0090817 A1    Apr. 26, 2007

(51) Int. Cl.
*G05F 1/40* (2006.01)

(52) U.S. Cl. .................................................. 323/282
(58) Field of Classification Search ................ 323/282, 323/283, 284, 285, 351

See application file for complete search history.

(56) References Cited

U.S. PATENT DOCUMENTS

2004/0245974 A1 * 12/2004 Kitani et al. ................ 323/284
2007/0223164 A1 *  9/2007 Oki et al. ...................... 361/94

* cited by examiner

*Primary Examiner*—Adolf Berhane
(74) *Attorney, Agent, or Firm*—Sawyer Law Group LLP

(57) ABSTRACT

A circuit, method, and system for intelligently soft starting switching regulators are provided. The circuit, method, and system provide for a switching circuit operable to couple an input voltage to an output of the switching regulator in response to a control signal, a controller operable to generate the control signal to control the switching of the switching circuit based in part on a reference voltage, and a soft start circuit operable to provide the reference voltage to the controller responsive to the switching of the switching circuit.

21 Claims, 6 Drawing Sheets

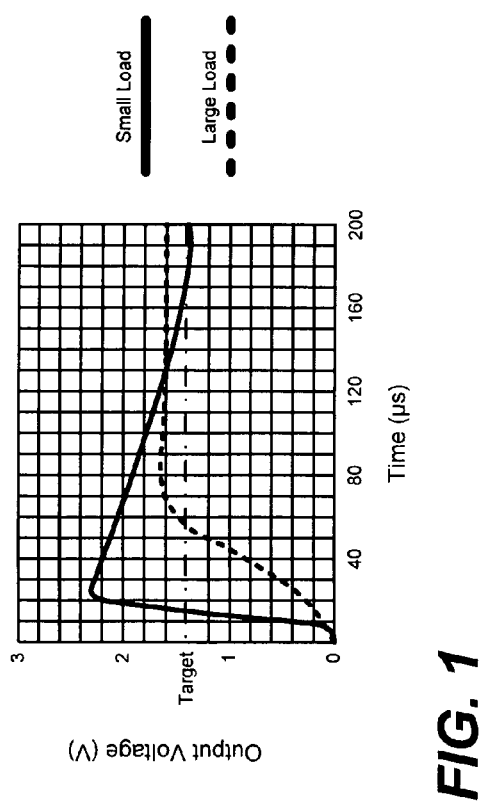
FIG. 1
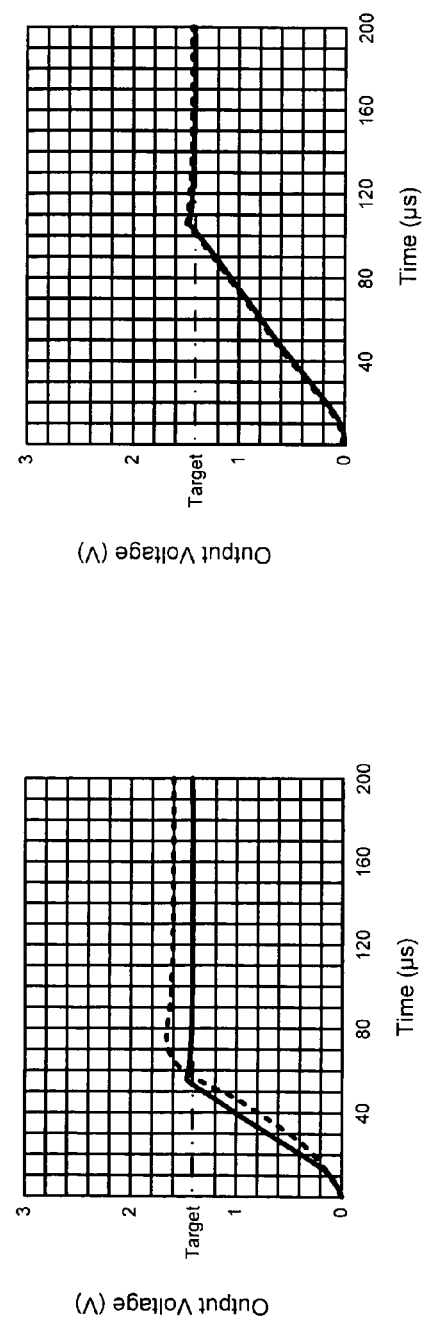
FIG. 2A
FIG. 2B

INTELLIGENT SOFT START FOR SWITCHING REGULATORS

FIELD OF THE INVENTION

The present invention relates generally to voltage regulators. More particularly, the present invention is directed to intelligent soft start for switching regulators.

BACKGROUND OF THE INVENTION

Voltage regulators are circuits designed to deliver a constant output voltage despite changes in load, temperature, and/or power supply. A switching regulator is a type of voltage regulator that produces a constant output voltage by alternately connecting and disconnecting an input voltage.

Switching regulators are becoming increasingly popular because of their efficiency, size, and weight. In addition, switching regulators, unlike linear regulators, can provide an output voltage that is higher or lower than the input voltage. A switching regulator that generates a reduced output voltage is usually referred to as a "buck" regulator and a switching regulator that generates an increased output voltage is usually referred to as a "boost" regulator. There are also other kinds of switching regulators, such as a "buck-boost" regulator, which is a switching regulator that can generate an output voltage that is opposite in polarity to the input, and a "flyback" regulator, which is a switching regulator that has multiple outputs and can generate output voltages that are less than or greater than the input.

FIG. 1 illustrates the startup characteristics of a conventional switching regulator under a sample small capacitor load ($C_{Load}$) and a sample large $C_{Load}$. In the example, both the small and large capacitor loads overshoot the target voltage of 1.4V as a result of excess current in the inductor. The small $C_{Load}$ takes almost 160 microsecond (µs) to reach the target voltage and the large $C_{Load}$ fails to reach the target voltage even at 200 µs. The overshoots and startup times are generally unacceptable.

To address the overshoot problem, some designers have incorporated a soft start into switching regulators. The soft start used increases a reference voltage provided to the switching regulator linearly so that excess current in the inductor is minimized. Depicted in FIGS. 2A-2B are the results of applying a linear soft start to the sample capacitor loads illustrated in FIG. 1.

In FIG. 2A, the linear soft start applied is sufficiently slow for the small $C_{Load}$, but not slow enough for the large $C_{Load}$. As a result, the large $C_{Load}$ still overshoots the target voltage. In FIG. 2B, the linear soft start utilized is slow enough for the large $C_{Load}$, but the small $C_{Load}$ then has to live with an unnecessarily long startup time.

Accordingly, there is a need for a soft start that optimizes startup time, minimizes overshoot, and is adaptable to load conditions. The present invention addresses such a need.

SUMMARY OF THE INVENTION

A circuit, method, and system for intelligently soft starting switching regulators are provided. In one aspect, a switching regulator is disclosed. The switching regulator includes a switching circuit operable to couple an input voltage to an output of the switching regulator in response to a control signal, a controller operable to generate the control signal to control the switching of the switching circuit based in part on a reference voltage, and a soft start circuit operable to provide the reference voltage to the controller responsive to the switching of the switching circuit.

Providing the reference voltage to the controller responsive to the switching of the switching circuit allows the switching regulator to dynamically adapt to varying loads and optimize startup time. In addition, the singularity at the transition from soft start to regulation found in linear soft starts is eliminated, which further minimizes overshoot of the target voltage.

In another aspect, a method of regulating an input voltage using a switching regulator is disclosed. The method provides for coupling the input voltage to an output of the switching regulator through a switching circuit in the switching regulator in response to a control signal, generating the control signal at a controller in the switching regulator to control the switching of the switching circuit based in part on a reference voltage, and providing the reference voltage to the controller through a soft start circuit in the switching regulator responsive to the switching of the switching circuit.

In a further aspect, a system that comprises an integrated circuit, a power source operable to power the integrated circuit, and a switching regulator operable to regulate a power output from the power source to the integrated circuit is disclosed. The switching regulator includes a switching circuit operable to couple an input voltage provided by the power output to an output of the switching regulator connected to the integrated circuit in response to a control signal, a controller operable to generate the control signal to control the switching of the switching circuit based in part on a reference voltage, and a soft start circuit operable to provide the reference voltage to the controller responsive to the switching of the switching circuit.

BRIEF DESCRIPTION OF THE DRAWINGS

FIG. 1 is a graph of the startup characteristics of a conventional switching regulator under sample capacitor loads.

FIGS. 2A-2B illustrate graphs of the startup characteristics of a switching regulator with linear soft start under sample capacitor loads.

DETAILED DESCRIPTION

The present invention relates generally to voltage regulators and more particularly to intelligent soft start for switching regulators. The following description is presented to enable one of ordinary skill in the art to make and use the invention and is provided in the context of a patent application and its requirements. Various modifications to the implementations and the generic principles and features described herein will be readily apparent to those skilled in the art. Thus, the present invention is not intended to be limited to the implementations shown, but is to be accorded the widest scope consistent with the principles and features described herein.

Figure 3:
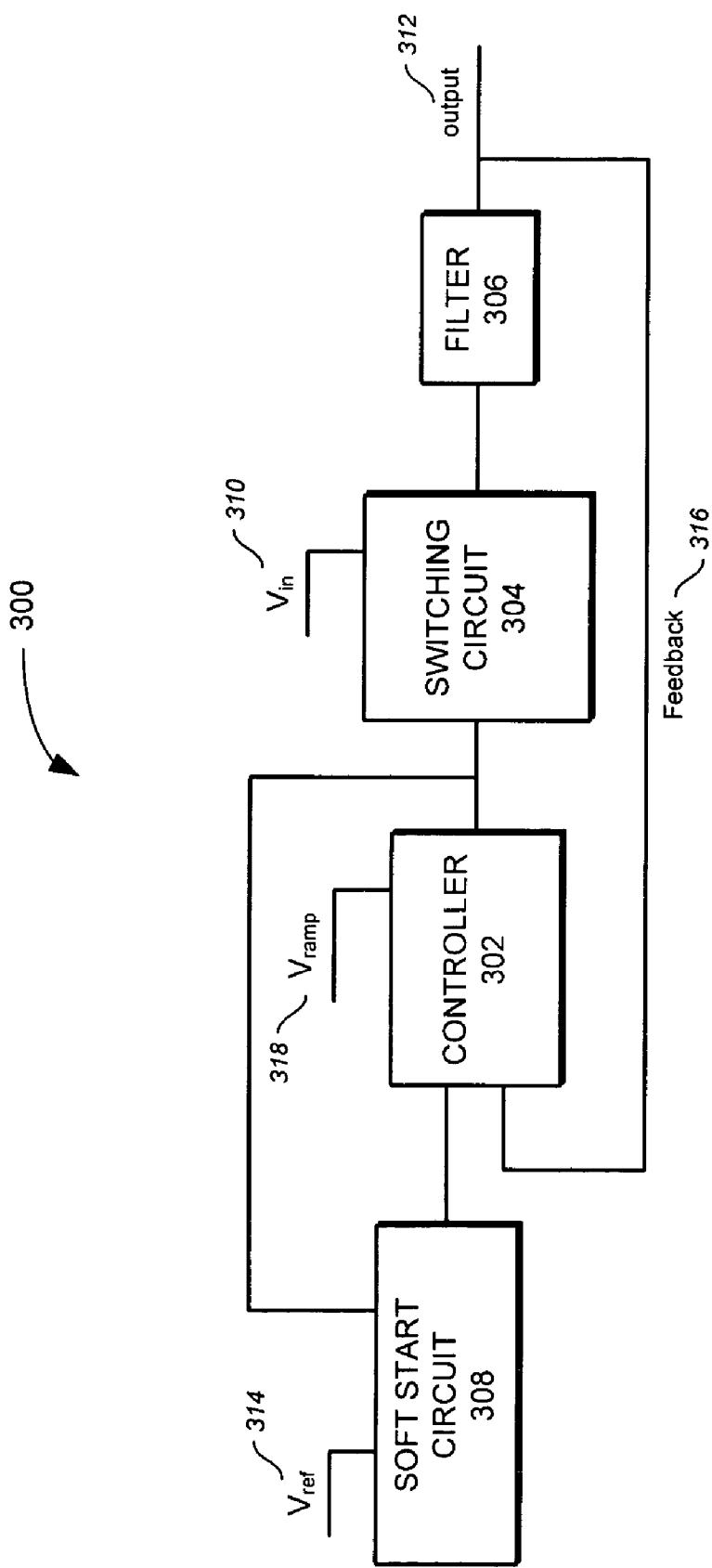
FIG. 3 depicts a block-level diagram of a switching regulator according to an aspect of the invention.

FIG. 3 depicts a block-level diagram of a switching regulator 300 according to an embodiment of the invention. Switching regulator 300 includes a controller 302, a switching circuit 304, a filter 306, and a soft start circuit 308. Switching circuit 304 is operable to couple an input voltage ($V_{in}$) 310 to an output 312 of switching regulator 300 in response to a control signal. Controller 302 is operable to generate the control signal to control the switching of switching circuit 304 based in part on a reference voltage ($V_{ref}$) 314.

In the embodiment, the control signal is also based on a feedback 316 from output 312 of switching regulator 300 and a ramp voltage ($V_{ramp}$) 318 from an internal circuit (not shown). Soft start circuit 308 is operable to provide reference voltage 314 to controller 302 responsive to the switching of switching circuit 304. Filter 306 is operable to filter input voltage 310 that passes through switching circuit 304.

Figure 4:
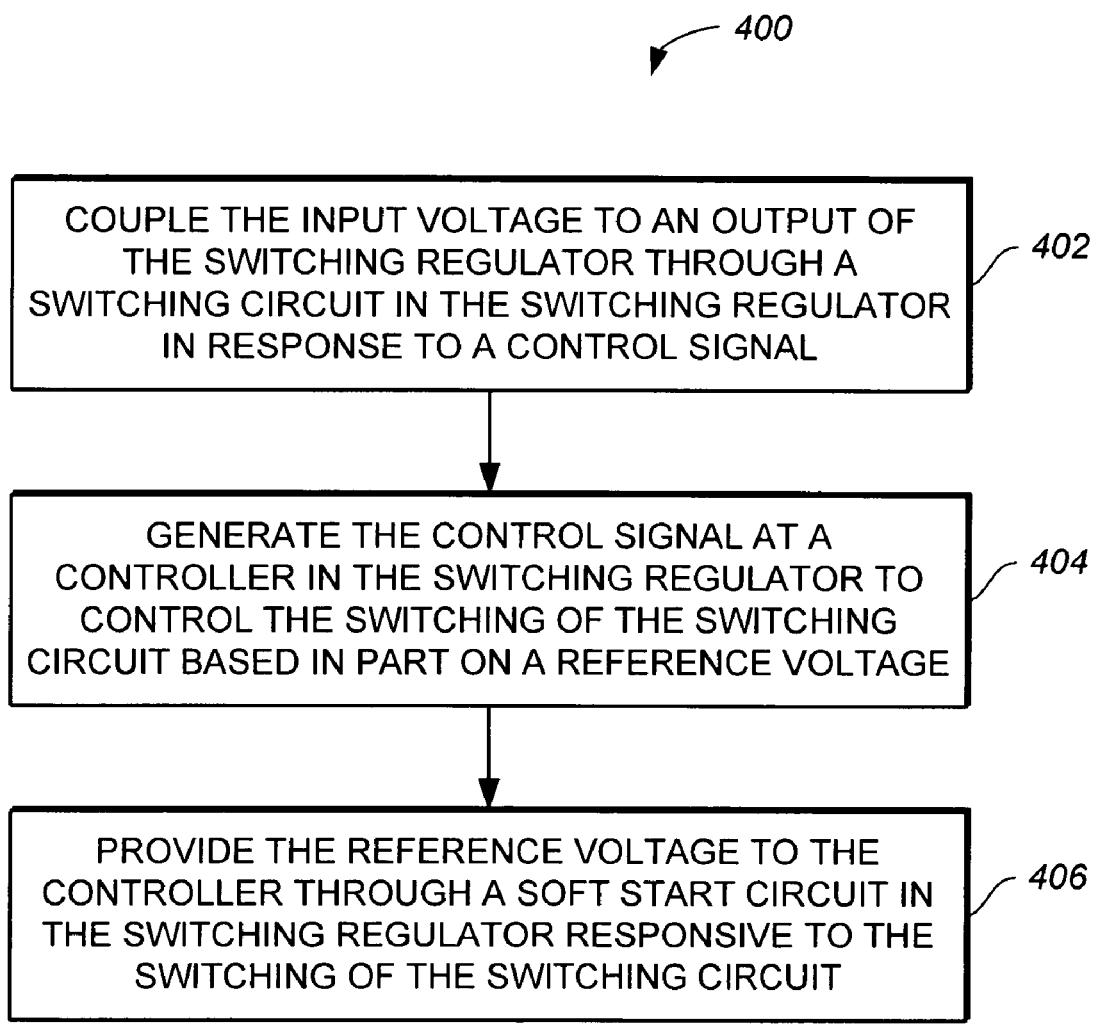
FIG. 4 shows a process flow of a method for regulating an input voltage using a switching regulator according to one embodiment of the invention.

Shown in FIG. 4 is a process flow 400 of a method for regulating an input voltage using a switching regulator according to one aspect of the invention. At 402, the input voltage is coupled to an output of the switching regulator through a switching circuit in the switching regulator in response to a control signal. The control signal to control the switching of the switching circuit is generated at a controller in the switching regulator based in part on a reference voltage (404). The reference voltage is provided to the controller through a soft start circuit in the switching regulator responsive to the switching of the switching circuit (406).

Figure 5:
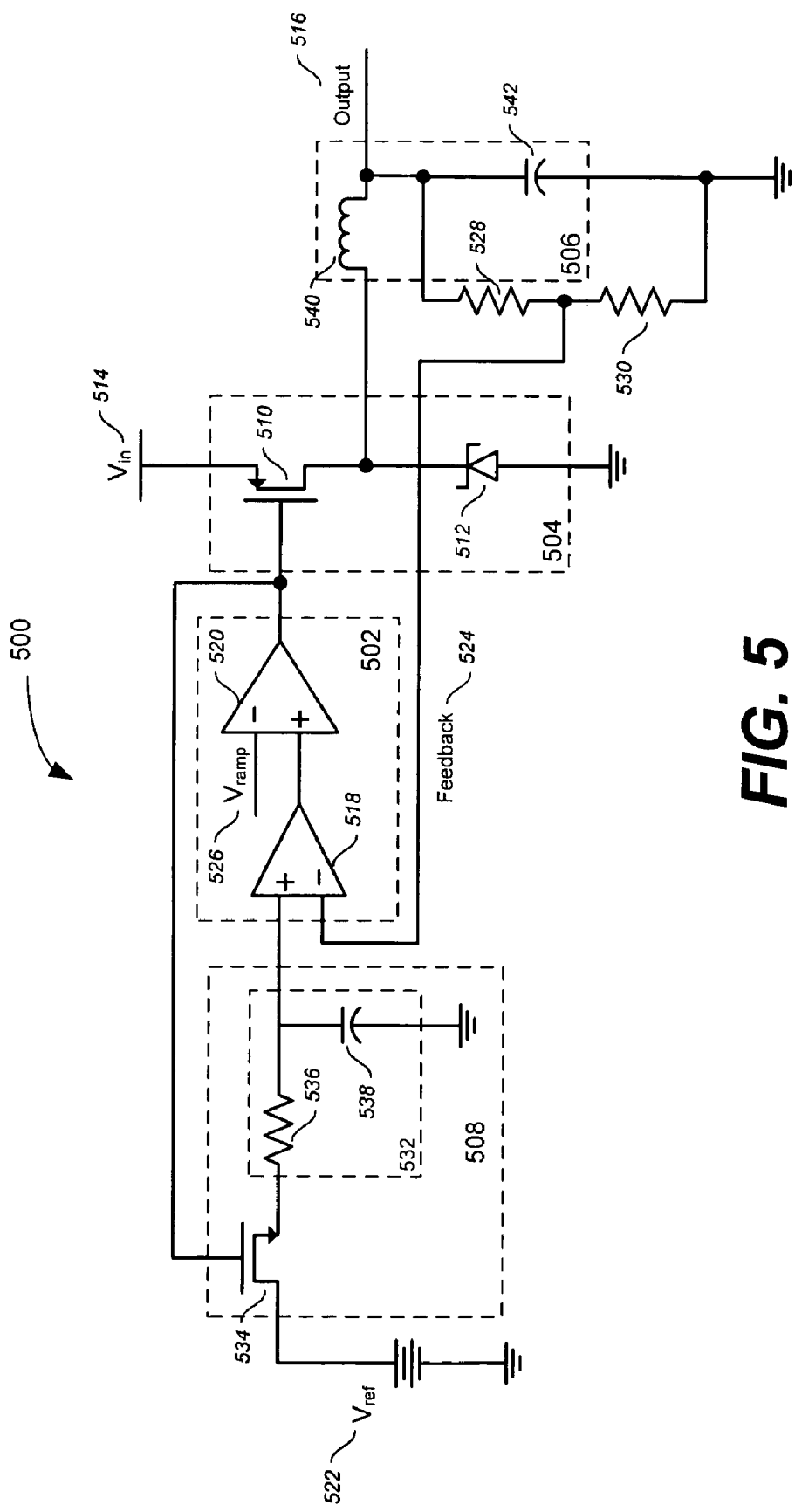
FIG. 5 illustrates a switching regulator according to an implementation of the invention.

FIG. 5 illustrates a switching regulator 500 according to an implementation of the invention. Switching regulator 500 includes a controller 502, a switching circuit 504, a filter 506, and a soft start circuit 508. Switching circuit 504 includes a transistor 510 and a rectifier 512. Transistor 510 is operable to couple an input voltage 514 to an output 516 of switching regulator 500 in response to a control signal generated by controller 502. Rectifier 512 is operable to direct a current flow in switching regulator 500 when input voltage 514 is not coupled to output 516 of switching regulator 500.

In the implementation, transistor 510 is a P-channel metal-oxide semiconductor field-effect transistor (MOSFET) and rectifier 512 is a diode. However, in other implementations, transistor 510 can be a bipolar transistor, such as a bipolar PNP transistor, and rectifier 512 can be a second transistor, such as an N-channel MOSFET or a bipolar NPN transistor.

Controller 502 is illustrated in FIG. 5 as including an error amplifier 518 and a comparator 520. Error amplifier 518 is operable to generate an output signal based on a reference voltage 522 from soft start circuit 508 and a feedback 524 from output 516 of switching regulator 500.

One or more resistors may be included to regulate feedback 524 from output 516 of switching regulator 500. In FIG. 5, two resistors 528 and 530 are included to regulate feedback 524 from output 516 of switching regulator 500 to error amplifier 518. In other embodiments, resistors may not be needed to regulate feedback 524. For instance, when the desired output is equal to reference voltage 522, feedback 524 may be accomplished with zero resistors by tying output 516 directly to feedback 524 without a voltage divider. Comparator 520 is then operable to generate the control signal to control the switching of switching circuit 504 based on the output signal from error amplifier 518 and a ramp voltage 526 from an internal circuit (not shown).

Soft start circuit 508 includes a filter 532 and a transistor 534. Filter 532 is operable to filter reference voltage 522 provided to controller 502 and transistor 534 is operable to couple reference voltage 522 to filter 532 in response to the control signal generated by controller 502. In the embodiment, filter 532 includes a resistor 536 and a capacitor 538 and transistor 534 is an N-channel MOSFET. In other embodiments, filter 532 may include a different combination of resistors and capacitors and transistor 534 may be a bipolar transistor, such as an bipolar NPN transistor, instead of an N-channel MOSFET.

In one implementation, the rate at which filter 532 in soft start circuit 508 increases reference voltage 522 provided to controller 502 is discontinuous. In another implementation, the rate at which transistor 534 in soft start circuit 508 couples reference voltage 522 to filter 532 is based on a load (not shown) coupled to output 516 of switching regulator 500.

Filter 506 includes an inductor 540 and a capacitor 542. Inductor 540 is operable to induce a voltage for output 516 of switching regulator 500 and capacitor 542 is operable to store the voltage from inductor 540. Although switching regulator 500 illustrated in FIG. 5 is a "buck" regulator, the present invention is also applicable to other types switching regulators, such as "boost," "buck-boost," and "flyback."

One state of switching regulator 500 is when transistor 510 in switching circuit 504 is in the "on" position, i.e., closed, and transistor 534 in soft start circuit 508 is in the "off" position, i.e., open. With transistor 510 in the "on" position, the current flow through inductor 540 is increased, which then raises the energy stored in inductor 540. The current then flows out through output 516 as well as into capacitor 542, which charges during this time. Inductor 540 and capacitor 542 acts as a filter because inductor 540 smoothes the current ripple and capacitor 542 reduces the voltage ripple. Feedback 524 will then flow back from output 516 to error amplifier 518 through resistors 528-530.

Since transistor 534 is in the "off" position in this state, the amount of reference voltage 522 being supplied to error amplifier 518 may be less than 100%, depending on whether capacitor 538 had previously been charged. As a result, the output signal from error amplifier 518 to comparator 520 will be high if feedback 524 is higher than the amount of reference voltage 522 soft start circuit 508 is providing to error amplifier 518. If the output signal is higher than ramp voltage 526, comparator 520 will generate a control signal to turn off transistor 510 in switching circuit 504, which will turn on transistor 534 in soft start circuit 508.

Once transistor 510 in switching circuit 504 is in the "off" position, input voltage 514 applied to inductor 540 is removed. Because the current in an inductor cannot change instantly, inductor 540 will try to maintain the current by finding another source. Diode 512 then comes into play to direct current flow in switching regulator 500 to ensure that there is always a path for the current to flow into inductor 540.

When transistor 534 in soft start circuit 508 is in the "on" position, reference voltage 522 flows across resistor 536 to controller 502 as well as into capacitor 538, which charges during this time. Hence, filter 532 dictates the rate in which reference voltage 522 is provided to controller 502. In some implementations, the rate at which filter 532 in soft start circuit 508 increases the reference voltage provided to controller 502 is discontinuous, i.e., not at a constant slope as with a linear soft start. This minimizes overshoot while optimizing startup time in comparison to linear soft starts because linear soft starts are clamped when the reference voltage is reached. Linear soft starts, therefore, require slower ramps to meet overshoot specifications.

At some point the reference voltage from filter 532 in soft start circuit 508 to error amplifier 518 in controller 502 will exceed feedback 524 from output 516 of switching regulator 500, possibly as a result of inductor 540 and capacitor 542 having discharged all or nearly all of their stored energy. Error amplifier 518 will then generate a low output signal to controller 520, which, in response, will generate a control signal to turn "on" transistor 510 in switching circuit 504 and turn "off" transistor 534 in soft start circuit 508.

In the embodiment, the rate at which transistor 534 in soft start circuit 508 couples reference voltage 522 to filter 532 is based on a load (not shown) coupled to output 516 of switching regulator 500 since transistor 534 in soft start circuit 508 is only turned "on" when transistor 510 in switching circuit 504 is turned "off." This allows switching regulator 500 to dynamically adapt to varying loads, which allows for faster startup when load-permitting and guarantees that ramping only occurs at a rate in which error amplifier 518 in controller 502 can maintain control. Linear soft starts, on the other hand, have to be designed for the worst case scenario. Accordingly, startup will be slow even when the load would allow a faster startup and still meet the overshoot requirements, as seen in FIGS. 2A-2B.

Figure 6:
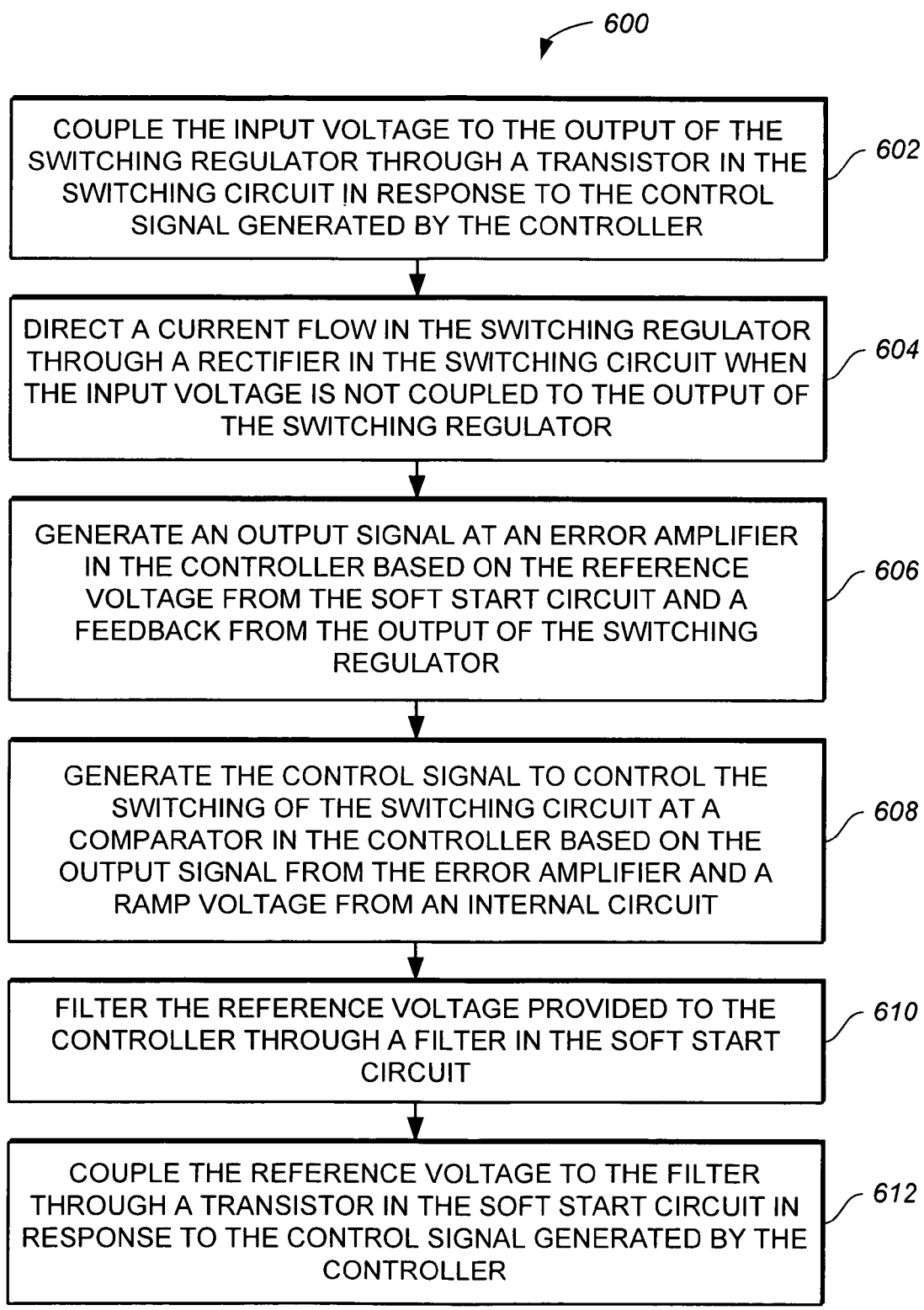
FIG. 6 is a flowchart of a method for regulating an input voltage using a switching regulator according to another embodiment of the invention.

Depicted in FIG. 6 is a process flow 600 of a method for regulating an input voltage using a switching regulator. The switching regulator includes a switching circuit, a controller, and a soft start circuit. At 602, the input voltage is coupled to the output of the switching regulator through a transistor in the switching circuit in response to the control signal generated by the controller. A current flow in the switching regulator is directed through a rectifier in the switching circuit when the input voltage is not coupled to the output of the switching regulator (604).

An output signal is generated at an error amplifier in the controller based on the reference voltage from the soft start circuit and a feedback from the output of the switching regulator (606) and the control signal to control the switching of the switching circuit is generated at a comparator in the controller based on the output signal from the error amplifier and a ramp voltage from an internal circuit (608). The reference voltage provided to the controller is filtered through a filter in the soft start circuit (610) and the reference voltage is coupled to the filter through a transistor in the soft start circuit in response to the control signal generated by the controller (612).

Figure 7:
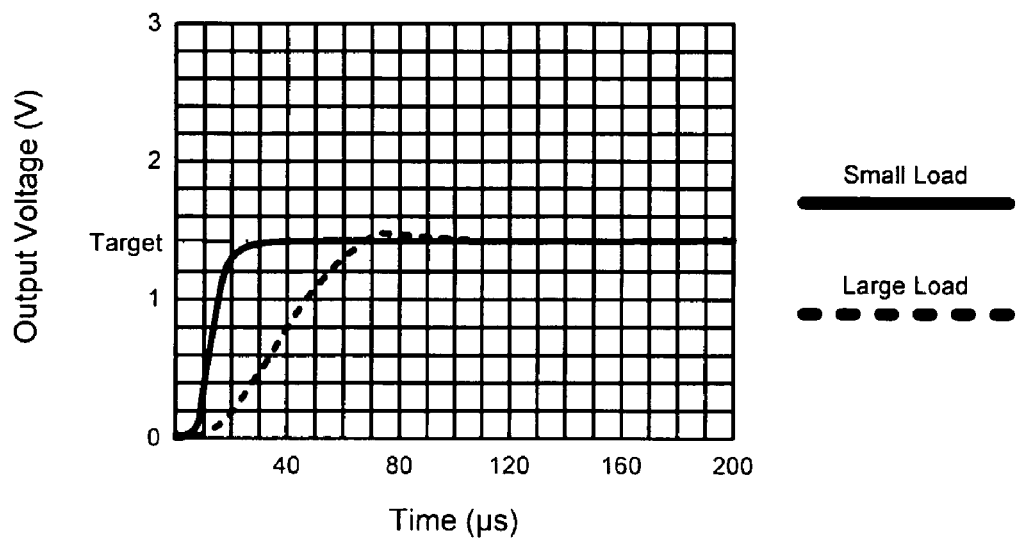
FIG. 7 depicts a graph of the startup characteristics of a switching regulator according to one implementation of the present invention under sample capacitor loads.

FIG. 7 shows the results of applying the sample capacitor loads illustrated in FIGS. 1 and 2A-2B to a switching regulator according to an implementation of the present invention. Comparing FIG. 7 to FIGS. 2A-2B, the difference between an intelligent soft start switching regulator and a linear soft start switching regulator is clearly evident. The large capacitor load is able to start in 70 µs with a 2.5% overshoot using intelligent soft start compared to the 105 µs with a 3% overshoot using linear soft start.

In addition, the small capacitor load is able to start in 30 µs using intelligent soft start rather than requiring the same 105 µs as the large capacitor load when using linear soft start. Further, the small $C_{Load}$ has zero overshoot with intelligent soft start as compared to the 2% overshoot with linear soft start.

Figure 8:
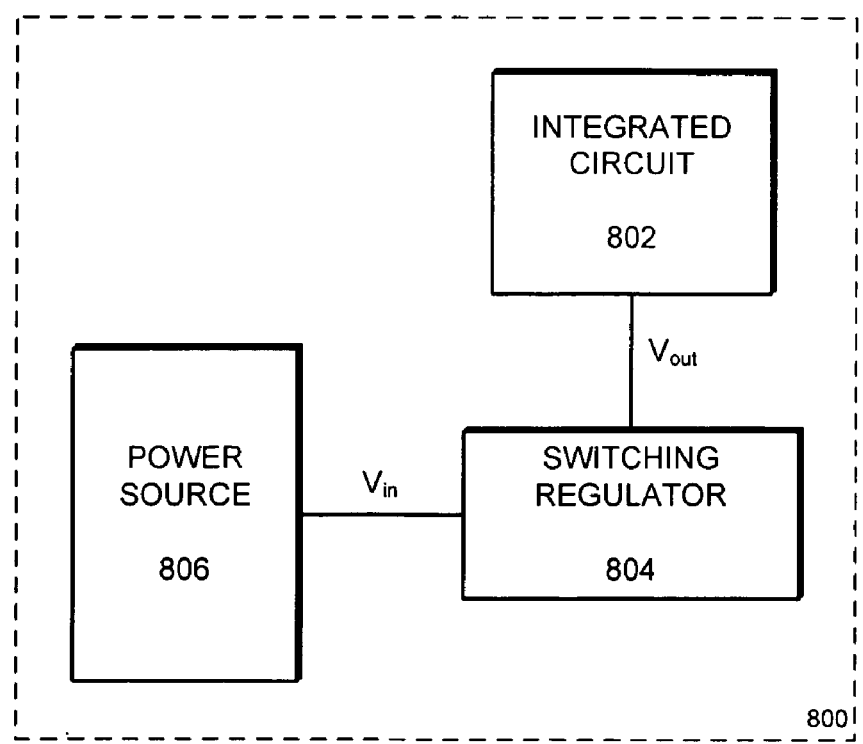
FIG. 8 shows a block diagram of a system with which embodiments of the present invention can be implemented.

Illustrated in FIG. 8 is a block diagram of a system 800 suitable for incorporating an aspect of the present invention. As shown, system 800 includes an integrated circuit 802, a switching regulator 804, and a power source 806. System 800 can be any of one of a variety of devices, such as an automotive product, a portable electronic device, an industrial application, or a piece of networking equipment.

Power source 806 is operable to power integrated circuit 802 and switching regulator is operable to regulate a power output from power source 806 to integrated circuit 802. In some embodiments, power source 806 is a battery. In other embodiments, power source 806 may be a plug in an electrical outlet.

Switching regulator 804 can be one of the switching regulators described above with respect to FIGS. 3 and 5, or a variation thereof. According to an aspect of the invention, switching regulator 804 includes a switching circuit operable to couple an input voltage to an output of switching regulator 804 in response to a control signal. The input voltage is provided by the power output from power source 806 and the output of switching regulator 804 is connected to integrated circuit 802. Switching regulator 804 also includes a controller operable to generate the control signal to control the switching of the switching circuit based in part on a reference voltage and a soft start circuit operable to provide the reference voltage to the controller responsive to the switching of the switching circuit.

In one implementation, the switching circuit in switching regulator 804 comprises a transistor operable to couple the input voltage to the output of switching regulator 804 in response to the control signal generated by the controller and a rectifier operable to direct a current flow in switching regulator 804 when the input voltage is not coupled to the output of switching regulator 804. The controller in switching regulator 804 may include an error amplifier operable to generate an output signal based on the reference voltage from the soft start circuit and a feedback from the output of switching regulator 804 and a comparator operable to generate the control signal to control the switching of the switching circuit based on the output signal from the error amplifier and a ramp voltage from an internal circuit.

The soft start circuit in switching regulator 804 can include a filter operable to filter the reference voltage provided to the controller and a transistor operable to couple the reference voltage to the filter in response to the control signal generated by the controller. In some implementations, the rate at which the filter in the soft start circuit increases the reference voltage provided to the controller is discontinuous and the rate at which the transistor in the soft start circuit couples the reference voltage to the filter in the soft start circuit is based on a load associated with integrated circuit 802.

Various implementations for intelligently soft starting switching regulators have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A switching regulator comprising:
    a switching circuit operable to couple an input voltage to an output of the switching regulator in response to a control signal;
    a controller operable to generate the control signal to control the switching of the switching circuit based in part on a reference voltage; and
    a soft start circuit operable to provide the reference voltage to the controller responsive to the switching of the switching circuit, wherein the soft start circuit includes a reference transistor selectively coupling the reference voltage to the controller in response to the control signal generated by the controller.

2. The switching regulator of claim 1, wherein the switching circuit comprises:
   a first transistor operable to couple the input voltage to the output of the switching regulator in response to the control signal generated by the controller; and
   a rectifier operable to direct a current flow in the switching regulator when the input voltage is not coupled to the output of the switching regulator.

3. The switching regulator of claim 2, wherein the rectifier is a diode or a second transistor.

4. The switching regulator of claim 3, wherein the first transistor is a P-channel MOSFET and the second transistor is an N-channel MOSFET.

5. The switching regulator of claim 1, wherein the controller comprises:
   an error amplifier operable to generate an output signal based on the reference voltage from the soft start circuit and a feedback from the output of the switching regulator; and
   a comparator operable to generate the control signal to control the switching of the switching circuit based on the output signal from the error amplifier and a ramp voltage from an internal circuit.

6. The switching regulator of claim 5, further comprising:
   one or more resistors operable to regulate the feedback from the output of the switching regulator to the error amplifier.

7. The switching regulator of claim 1, wherein the soft start circuit comprises:
   a filter operable to filter the reference voltage provided to the controller, wherein the reference transistor is operable to selectively couple the reference voltage to the filter in response to the control signal generated by the controller.

8. The switching regulator of claim 7, wherein a rate at which the filter in the soft start circuit increases the reference voltage provided to the controller is discontinuous.

9. The switching regulator of claim 7, wherein a rate at which the reference transistor in the soft start circuit couples the reference voltage to the filter is based on a load coupled to the output of the switching regulator.

10. A method of regulating an input voltage using a switching regulator, the method comprising:
    coupling the input voltage to an output of the switching regulator through a switching circuit in the switching regulator in response to a control signal;
    generating the control signal at a controller in the switching regulator to control the switching of the switching circuit based in part on a reference voltage; and
    providing the reference voltage to the controller through a soft start circuit in the switching regulator responsive to the switching of the switching circuit, wherein providing the reference voltage includes selectively coupling the reference voltage to the controller through a reference transistor in the soft start circuit in response to the control signal generated by the controller.

11. The method of claim 10, wherein coupling the input voltage to the output of the switching regulator comprises:
    coupling the input voltage to the output of the switching regulator through a transistor in the switching circuit in response to the control signal generated by the controller; and
    directing a current flow in the switching regulator through a rectifier in the switching circuit when the input voltage is not coupled to the output of the switching regulator.

12. The method of claim 10, wherein generating the control signal to control the switching of the switching circuit comprises:
    generating an output signal at an error amplifier in the controller based on the reference voltage from the soft start circuit and a feedback from the output of the switching regulator; and
    generating the control signal to control the switching of the switching circuit at a comparator in the controller based on the output signal from the error amplifier and a ramp voltage from an internal circuit.

13. The method of claim 10, wherein providing the reference voltage to the controller comprises:
    filtering the reference voltage provided to the controller through a filter in the soft start circuit; and
    coupling the reference voltage to the filter through the reference transistor in the soft start circuit in response to the control signal generated by the controller.

14. The method of claim 13, wherein a rate at which the filter in the soft start circuit increases the reference voltage provided to the controller is discontinuous.

15. The method of claim 13, wherein a rate at which the reference transistor in the soft start circuit couples the reference voltage to the filter is based on a load coupled to the output of the switching regulator.

16. A system comprising:
    an integrated circuit;
    a power source operable to power the integrated circuit; and
    a switching regulator operable to regulate a power output from the power source to the integrated circuit, the switching regulator comprising
    a switching circuit operable to couple an input voltage to an output of the switching regulator in response to a control signal, wherein the input voltage is provided by the power output from the power source and the output of the switching regulator is connected to the integrated circuit;
    a controller operable to generate the control signal to control the switching of the switching circuit based in part on a reference voltage; and
    a soft start circuit operable to provide the reference voltage to the controller responsive to the switching of the switching circuit, wherein the soft start circuit includes a reference transistor selectively coupling the reference voltage to the controller in response to the control signal generated by the controller.

17. The system of claim 16, wherein the switching circuit in the switching regulator comprises:
    a regulator transistor operable to couple the input voltage to the output of the switching regulator in response to the control signal generated by the controller; and
    a rectifier operable to direct a current flow in the switching regulator when the input voltage is not coupled to the output of the switching regulator.

18. The system of claim 16, wherein the controller in the switching regulator comprises:
    an error amplifier operable to generate an output signal based on the reference voltage from the soft start circuit and a feedback from the output of the switching regulator; and
    a comparator operable to generate the control signal to control the switching of the switching circuit based on the output signal from the error amplifier and a ramp voltage from an internal circuit.

19. The system of claim 16, wherein the soft start circuit in the switching regulator comprises:
a filter operable to filter the reference voltage provided to the controller, wherein the reference transistor is operable to couple the reference voltage to the filter in response to the control signal generated by the controller.

20. The system of claim 19, wherein a rate at which the filter in the soft start circuit increases the reference voltage provided to the controller is discontinuous.

21. The system of claim 19, wherein a rate at which the reference transistor in the soft start circuit couples the reference voltage to the filter in the soft start circuit is based on a load associated with the integrated circuit.

* * * * *